Patented Jan. 6, 1931

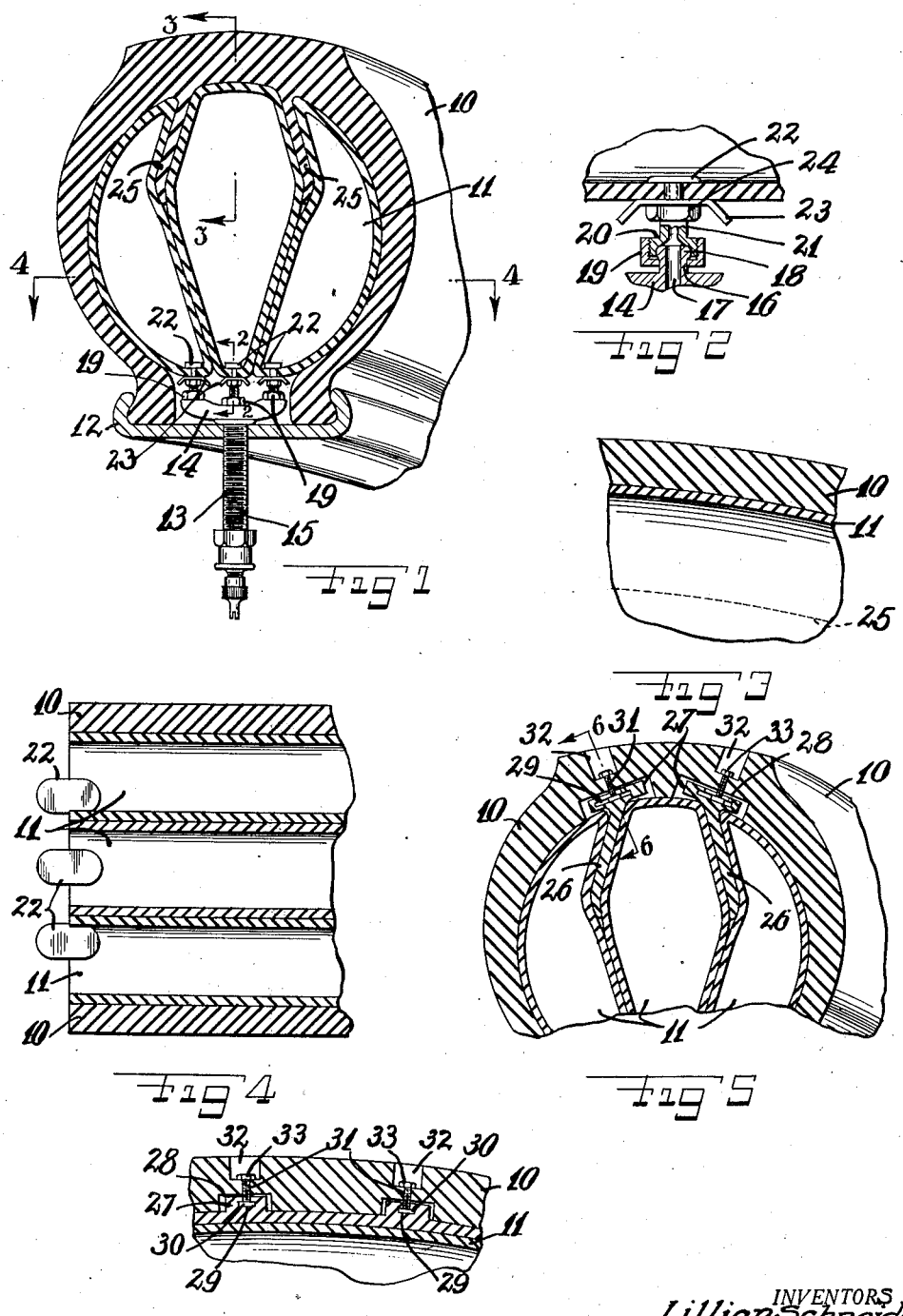

1,788,335

UNITED STATES PATENT OFFICE

LILLIAN SCHNEIDER AND AARON REICH, OF BROOKLYN, NEW YORK

SECTIONAL TUBE FOR VEHICLE TIRES

Application filed November 20, 1929. Serial No. 408,452.

The invention relates to new and useful improvements in a vehicle tire.

This invention relates to similar subject matter as that disclosed in our copending application, Serial No. 408,451, filed simultaneously with this application.

The object of the invention is to provide a device of the class mentioned which is of simple durable construction, dependable in use and efficient in action, and which can be manufactured and sold at a reasonable cost.

The invention also proposes a resilient tire shoe, and a plurality of individual tube sections therein for its pneumatic inflation accomplishing partial collapsing only, upon puncturing of some of the tube sections. It is also proposed to provide a means for holding each of the tube sections in relative positions to each other to distribute the possibility of puncture evenly to the different sections so that one of the sections is not unduly mutilated.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a fragmentary sectional perspective view of a device constructed according to this invention.

Fig. 2 is a fragmentary enlarged sectional view taken on the line 2—2 of Fig. 1.

Fig. 3 is a fragmentary longitudinal sectional view taken on the line 3—3 of Fig. 1.

Fig. 4 is a fragmentary horizontal sectional view taken on the line 4—4 of Fig. 1.

Fig. 5 is a fragmentary view similar to a portion of Fig. 1, but illustrating a modified form.

Fig. 6 is a fragmentary sectional view taken on the line 6—6 of Fig. 5.

The vehicle tire consists of a resilient tire shoe 10, and a plurality of individual tube sections 11 within the tire shoe 10 for its pneumatic inflation accomplishing partial collapsing only, upon puncturing of some of the tube sections. The tire shoe 10 is of conventional construction and is shown engaged upon a wheel rim 12. The tube sections 11 are shown adjacent each other and each one constituting a complete circle. In transverse section of the tire, the tube sections divide it into adjacent longitudinal chambers. Three tube sections have been illustrated but any desired number may be used. A tire valve 13 is shown arranged for the simultaneous inflation of all of the tube sections. This arrangement provides equal internal pressures.

The tire valve 13 consists of a transverse head forming portion 14 and a stem portion 15. For each of the inner tube sections, a projection 16 is arranged upon the head forming portion of the tire valve and an individual air passage 17 connects with this projection and extends completely thru the stem portion 15. The ends of the passages 17 are provided with valves as described in the above mentioned copending application. The projections 16 terminate in head portions 18 and a nut 19 rotatively engages upon each of the projections 16 and threadedly engages the enlarged ends 20 of hollow members 21 which are engaged thru the tube sections. The hollow member is formed with a head portion 22 within the tube section, a clamp plate 23 is disposed upon the hollow member on the outside of the tube section and a nut 24 threadedly engages upon the hollow member and forces the clamp plate firmly against the tube section.

The means for holding each of the tube sections in relative positions to each other to distribute the possibility of puncture evenly to the different tube sections so that one of the sections is not unduly mutilated consists of baffle strips 25 integral with the tire shoe 10 and arranged longitudinally in a complete circle within the hollow of the shoe. These baffle strips divide the tread of the tire shoe into transverse equal sections. Necessarily upon inflation of the inner tube sections, these baffle strips hold the outer peripheries of the different tube sections in desired spaced relations to each other. During use of the tire and upon picking up of a puncturing article, there is an even chance for the puncture to occur in any of the tube sections.

In the modified form of the device illustrated in Fig. 5, a different means has been illustrated for holding each of the tube sections in relative positions to each other. This means consists of baffle strips 26 arranged longitudinally within the tire shoe 10 in a complete circle and separate from the tire shoe. Each of the baffle strips is provided with a plurality of spaced outer projections 27 slidably engaging within channel strip members 28 imbedded in the tire shoe. Each of the outer projections 27 is formed with a transverse slot 29 receiving the head 30 of a bolt 31 extending thru the tire shoe into a recess 32 upon the periphery of the tire shoe. A nut 33 engages each of the bolts and in tight condition normally holds the baffle strips in adjusted positions.

The nuts 33 may be loosened and the baffle strips transversely adjusted for dividing the interior of the tire shoe differently. Upon inflation of the tube sections, they are limited in positions as determined by the baffle strips. In this condition the tire is normally used. In the event of a puncture of one of the tube sections, the nuts 31 are removed so that one or the other of the baffle strips is loose depending upon which of the tube sections have been punctured. Immediately the tube sections still containing air, expand for filling up the space caused by the deflation of the punctured tube sections. In this condition the tire may be used until a service station is reached for repairing. The baffle strips also bend to restrict the different tube sections to proper inflations, that is, while the pressures within each of the tube sections are the same, different quantities of air may enter the different tube sections and unduly inflate certain of them.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. A vehicle tire, comprising a resilient tire shoe, a plurality of individual tube sections therein for its pneumatic inflation, and means for holding each of the tube sections in relative positions to each other to distribute the possibility of puncture evenly to the different sections so that one of the sections is not unduly mutilated comprising longitudinal circular baffle strips between said tube sections, and coacting means on said baffle strips and tire shoe for adjustably supporting the baffle strips, said coacting means including holding nuts located in recesses in the tire shoe so as to be reachable from the exterior of the tire shoe.

2. A vehicle tire, comprising a resilient tire shoe, a plurality of individual tube sections therein, and means for holding each of the tube sections in relative positions to each other to distribute the possibility of puncture evenly to the different sections so that one of the sections is not unduly mutilated, said means comprising longitudinal circular baffle strips between said tube sections and adjustably mounted within the tire shoe, and coacting means on the baffle strips and tire shoe for adjusting the baffle strips from the exterior of the tire.

In testimony whereof we have affixed our signatures.

LILLIAN SCHNEIDER.
AARON REICH.